(No Model.)
W. F. BOWERS.
CONCENTRATOR BELT.
No. 575,142. Patented Jan. 12, 1897.
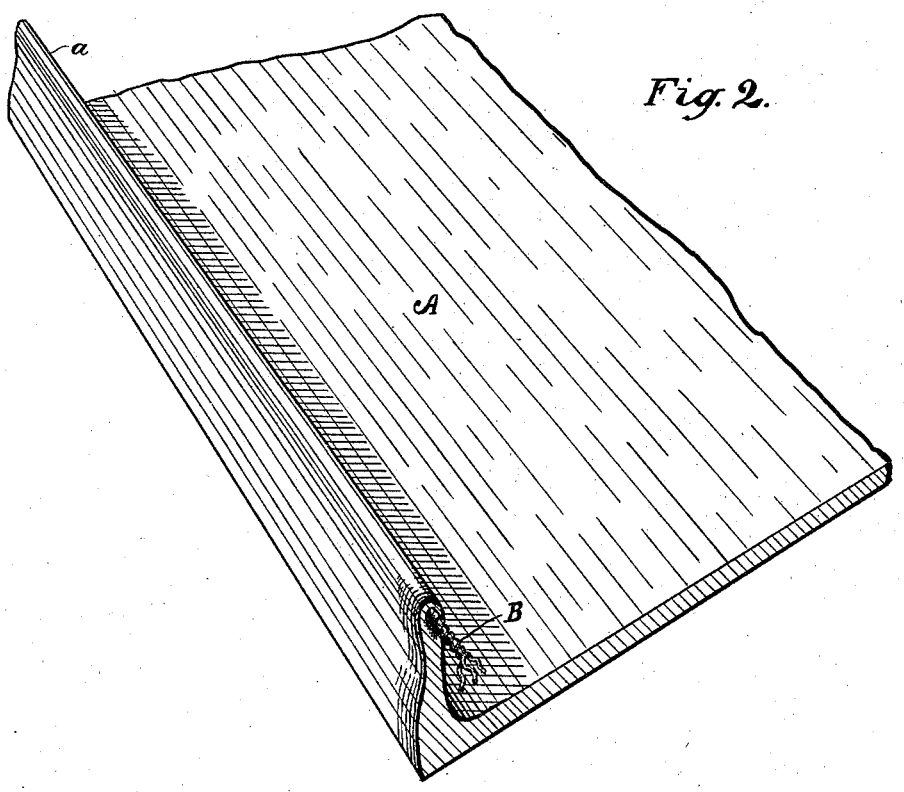

UNITED STATES PATENT OFFICE.

WILLIAM F. BOWERS, OF SAN FRANCISCO, CALIFORNIA.

CONCENTRATOR-BELT.

SPECIFICATION forming part of Letters Patent No. 575,142, dated January 12, 1897.

Application filed June 1, 1896. Serial No. 593,712. (No model.)

*To all whom it may concern:*

Be it known that I, WILLIAM F. BOWERS, a citizen of the United States, residing in the city and county of San Francisco, State of California, have invented an Improvement in Concentrator-Belts; and I hereby declare the following to be a full, clear, and exact description of the same.

My invention relates to that class of concentrator-belts which are made of rubber and are provided with rubber side flanges. These belts are endless and are mounted and adapted to travel over terminal drums or rollers. One of the most serious difficulties experienced in the use of these belts, which are very expensive, is the cracking and breaking down of the flanges. It will readily be seen that as these belts pass over their terminal drums the flanges rising above the body of the belt pass through an arc of a circle of greater diameter than said body, and consequently said flanges, and especially their upper edges, are subjected to a very much greater strain than the body of the belt. This difficulty is universally recognized and has led to many attempts to overcome it. One of the earliest suggestions was to make the flanges of purer and consequently more elastic rubber than the body of the belt, so that they would yield to the strain of passing around the terminal drums. Other suggestions and practices have been directed in the line of causing the flanges to lie down either inwardly upon and parallel with the surface of the belt or outwardly in a plane parallel therewith, so that the radius of their curvature in passing around the drums would be practically the same as that of the body of the belt. These examples are sufficient to call attention to the difficulty experienced of the cracking or breaking down of the flanges, due to the cause mentioned.

The object of my invention is to overcome this difficulty by providing a flange which will not crack or break down under the strain of passing around the terminal drums and to make said flange without increased cost and of such a character that its manufacture in molds is easy and practicable.

My invention consists in a concentrator-belt having side flanges of rubber, provided at their upper edges with an embedded separate reinforcing-strip of some flexible material, said strip being in its best form substantially non-elastic.

Referring to the accompanying drawings, Figure 1 is a cross-section of my belt. Fig. 2 is a perspective view of a small piece, showing, for the sake of greater clearness, the reinforcing strip or cord B projecting from the flange.

A represents a portion of a rubber concentrator-belt, and *a* represents one of its flanges. This flange may extend upwardly from the surface of the belt at any angle, either an acute or an obtuse angle, or it may be a right angle, as I have here shown, making the flange a vertical one, and said flange may be straight or waving or of other shape. This flange is made of rubber in the ordinary manner, but it has embedded within it, near its upper edge, a separate reinforcing-strip B of flexible material, extending throughout its entire length. This strip, by strengthening the flange, will keep it from cracking or breaking down, but the best effect is produced when said strip is of a substantially non-elastic material, so that it will not permit the flange itself to stretch in passing around the terminal drums, but, by its want of elasticity, will cause said flange, under the strain, to be forced either inwardly or outwardly down approximately to the plane of the body of the belt as it passes around the rollers. Any suitable material may be used for this strip, but I have found in practice that a strong cord is the best. If this non-elastic reinforcing-strip were not present, the tendency of the flange would be to stretch as it passes around the rollers and to crack on the edge, especially in cold weather, and heretofore it has not been the object to provide a non-elastic flange, but, on the contrary, to use flanges which are elastic and to accomplish the result of causing the flange to lie down in passing around the rollers by some peculiar angle at which the flange lies to the body of the belt or some peculiar shape of the flange; but even these expedients do not prevent the flange from cracking or breaking down to a certain extent, as it is not reinforced and it must stretch more or less; but by means of my construction my flange may be of any shape and set at any angle, even at a right angle, as I have shown, which is the best form of flange, and yet by being rendered substantially non-elastic by the presence of the reinforcing-strip said flange will lie down properly in passing around the roller and be subjected to less strain, and what strain it receives will be fully resisted by the strip, and there will be no cracking or breaking down.

I am aware that fabric has been incorporated with rubber in various forms, and that in concentrator-belts the fabric of the body of the belt has been extended into the flange; but this fabric is a mere sheet of duck, the extension of which has not been required to extend very far up into the flange to serve its specific purpose; and even if it should be so extended it would, by reason of presenting its edge to the strain, be of no utility as a reinforce material to resist the strain or to render the flange substantially non-elastic. In fact, the presence of a sheet of duck in the flange has been deemed detrimental and abandoned, and consequently a suggestion has arisen of cutting the duck which is in the flange upon the bias to avoid the stiffness and permit the flange to easily stretch, which is the very object of my invention to overcome.

The construction which I have here shown is a practical one, and the belt can be readily molded, requiring no complication of mold and no extra manipulation in its manufacture.

Having thus described my invention, what I claim as new, and desire to secure by Letters Patent, is—

1. A concentrator-belt having rubber side flanges in the upper portions of which is embedded a separate flexible reinforcing-strip extending throughout the length of the flanges.

2. A concentrator-belt having rubber side flanges, in the upper portions of which is embedded a separate substantially non-elastic flexible reinforcing-strip extending throughout the length of the flanges.

3. A concentrator-belt having rubber side flanges in the upper portions of which is embedded a substantially non-elastic flexible cord extending throughout the length of the flanges.

In witness whereof I have hereunto set my hand.

WILLIAM F. BOWERS.

Witnesses:
S. H. NOURSE,
WM. F. BOOTH.